United States Patent [19]

Foster

[11] Patent Number: 4,495,405
[45] Date of Patent: Jan. 22, 1985

[54] AUTOMATIC CONTROL SYSTEM INCLUDING ERROR PROCESSING LOOP

[75] Inventor: John E. Foster, Miami, Fla.

[73] Assignee: Coulter Electronics, Inc., Hialeah, Fla.

[21] Appl. No.: 421,812

[22] Filed: Sep. 23, 1982

[51] Int. Cl.³ .............................................. H05B 1/02
[52] U.S. Cl. .................... 219/510; 219/492; 219/497; 219/501; 323/243; 323/245
[58] Field of Search ............... 219/490, 510, 494, 499, 219/505, 497, 501, 508, 509, 492; 323/236, 241, 243, 245, 281

[56] References Cited

U.S. PATENT DOCUMENTS

| | | | |
|---|---|---|---|
| 3,946,200 | 3/1976 | Juodikis | 219/499 |
| 4,258,310 | 3/1981 | Asakawa et al. | 323/281 |
| 4,300,037 | 11/1981 | Padden | 219/497 |
| 4,366,433 | 12/1982 | Imazeki et al. | 323/281 |

*Primary Examiner*—M. H. Paschall
*Attorney, Agent, or Firm*—Silverman, Cass & Singer, Ltd.

[57] ABSTRACT

Automatic control system for controlling the switching point of a device which operates in at least two modes of operation, provides for automatic modification of the error signal which controls the switching action of the device by processing in real time the error signal to generate a resultant signal representative of the variation of the error signal over a time period, and then employing the resultant signal to modify the effect of the reference signal from which the error signal is derived. The control system can be employed in a chemical analysis instrument to control the on-off operation of a heater which supplies heated air to incubate samples.

19 Claims, 8 Drawing Figures

AUTOMATIC CONTROL SYSTEM INCLUDING ERROR PROCESSING LOOP

BACKGROUND OF THE INVENTION

This invention relates to real time error processing in automatic control systems for the operation of devices and equipment generally. More particularly this invention relates to a system for modifying the switching point in on-off operation of the heater in an incubation system for samples in automatic chemical analysis instruments.

In the control of equipment such as motors and heaters which have high power demand, discrete level control, typically on-off control systems, is generally more predictable and less expensive than a proportional control system for attempted continuous levels of operation. However, even when on-off switching is performed accurately, power transmission and heat transfer can require a time delay resulting in "overshoot and undershoot" relative to the desired value of the controlled variable.

In modern laboratory analysis, for example, analysis of blood serums, large numbers of serum samples must be processed typically for enzyme reaction analysis under controlled temperature. High speed, automatic instruments such as the instruments described in U.S. Pat. No. 4,234,538 have been developed to perform such reaction measurements. This patent describes instruments for photometric measurement of the reaction of large numbers of samples.

Accurate determination of such enzyme reaction measurements requires that the measurements be made at known temperatures; when repeated measurements over time are to be made, a practical instrument must be capable of maintaining the reaction vessels and temperature-sensitive reactions within continuous tolerance in order to eliminate difficult temperature correction, particularly in the reaction and measurement of large number of samples. Thus, controlling overshoot and undershoot of the reaction temperature within acceptable tolerance is critically important to a reliable instrument.

In reissued U.S. Pat. No. Re. 29,880, Duff describes an instrument for photometric measurement in which the sample vessels can be mounted in a relatively large, easily controlled heating chamber in order to maintain desired temperature. Such direct heating systems are generally inadequate for complex instruments.

U.S. Pat. No. 3,916,152 describes a temperature control system for an analyzer instrument in which the samples are heated and the rate of temperature increase is determined. A rate limiter circuit compares the rate of temperature increase to a predetermined value, which is pre-selected by trial and error, and when the rate of increase exceeds the predetermined value, the rate limiter circuit signals a trigger to switch off the heater. When the temperature of the sample cuvette falls below the desired predetermined temperature value, the trigger circuit is separately signaled to switch on the heater. Thus, the rate limiter circuit functions only to turn off the heater when the rate limiter signal (the rate of temperature increase) is of sufficient, predetermined magnitude to pass a hold-off gate and to deactivate the pulses from the heater trigger. Consequently, the switching point for the heater is fixed by entirely predetermined limits.

SUMMARY OF THE INVENTION

Improvement in control system for on-off operation of a device, according to this invention, provides for automatic modification of the error signal which controls the on-off switching of the device by processing in real time the error signal to generate a resultant signal representative of the variation of the error signal over a time period. The resultant signal can then be employed to modify the effect of the reference signal from which the error signal is derived.

In a preferred embodiment, the error signal can be employed as the input to an error processor which includes an integrating circuit to produce an output, resultant signal which is the mean of the error signal over a time period. The resultant signal is then used to modify the effect of the reference signal at a summing node from which the error signal is generated. The resultant signal can be employed as positive feedback to an amplifier for the error signal which is then used to control the switching action of the device.

This control system employing the error processing loop can be applied to control the on-off operation of a heater which supplies heated air to incubate the samples in a chemical analysis instrument. The control system provides automatic response to shift the switching point of the heater with respect to the temperature sensing signal at the samples, to compensate for changes or disturbances in the heater or other thermal conditions affecting the temperature at the samples.

DESCRIPTION OF THE PREFERRED EMBODIMENT

Figure 1:
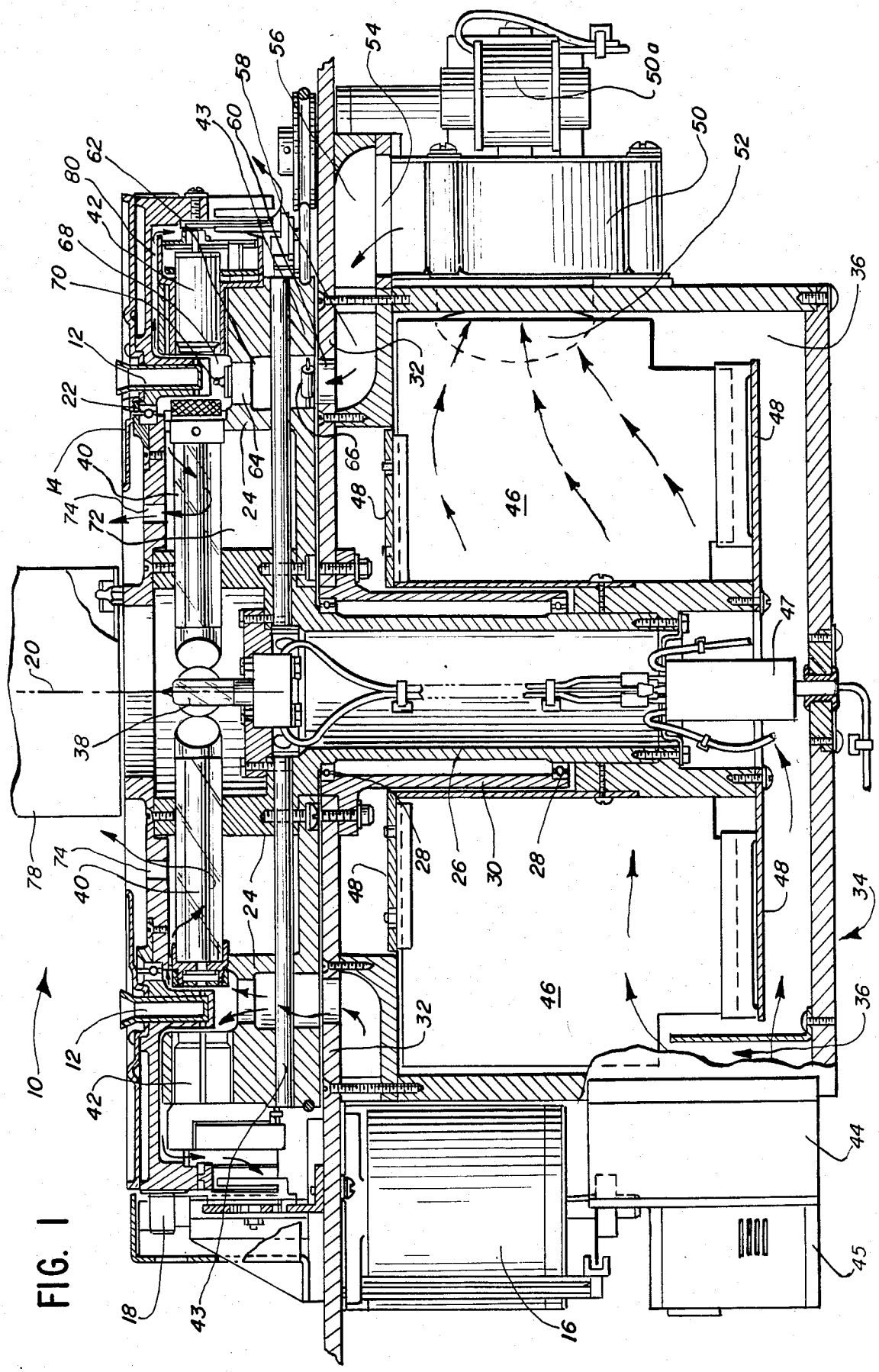
FIG. 1 is a partially sectional, elevation view of a chemical analyzer instrument illustrating a heating system controlled in one embodiment of the control system of this invention.

FIG. 1 illustrates a chemical analyzer instrument, generally designated by reference character 10, which includes a heating and incubating system employing an embodiment of an on-off control system according to this invention. A generally annular array of multiple cuvettes 12, employed as individual reaction vessels, is mounted on a turntable 14 including a generally planar body from which the open-mouthed cuvettes 12 extend downwardly. Turntable 14 is driven, preferably stepwise, by a motor 16 and suitable gearing 18 and journaled for rotation on axis 20 by means of bearings 22, permitting the turntable 14 to be rotated independently of the rotation of coaxially mounted photometer rotor 24.

Rotor 24 is provided with a depending cylindrical sleeve 26 which is journaled on bearings 28 mounted to the inner cylindrical wall 30 which depends from the upper annular baseplate 32 on the large annular base 34 enclosing the large annular chamber 36.

Rotor 24 supports the rotation of a plurality of photometers, preferably including a single radiation source 38 on axis 20 and a plurality of radially spaced lens containing optical tubes 40, two of which are shown in FIG. 1. Optical tubes 40 project radiation from source 38 through the cuvettes 12 to photoelectric detectors 42 for photometric analysis of the reactions conducted in the cuvettes 12, as more fully described in the aforementioned U.S. Pat. No. 4,234,538.

In order to maintain the temperature of the cuvettes 12 and their reaction contents at 37° C. ±0.1° C., the illustrated instrument 10 is provided with a heating system in which the heating medium is air. Referring again to FIG. 1, fast response heater 44 and a blower 45 are mounted on the side of base 34 to heat air discharged into the enclosed chamber 36. While fan 45 operates continuously, heater 44 operates in on and off modes under a control system in accordance with this invention, as more fully described hereinafter. Circuit boards 46 are mounted on supports 48 radially projecting from rotor sleeve 26 and rotate therewith similar to fan blades which mix the heated air in chamber 36. As shown in FIG. 1, circuit boards 46 are generally equal in number to the plurality of photometric detectors 42 to which they are electrically connected by leads routed through tubes 43 for analog to digital signal conversion prior to signal transmission over slip ring 47 to data processing.

A fan 50, and fan drive 50a are mounted on base 34 and, generally oppositely positioned in relation to heater 44. Fan 50 is provided with port 52 for intake of heated air from chamber 36. Fan 50 provides the discharge pressure required to force the heated air through the conduit system, external to chamber 36, for delivery to the cuvettes 12. Thus, fan 50 forces the heated air from chamber 36 through a discharge port 54 entering a duct 56 depending from upper base plate 32 of base 34. Forced air flows from duct 56 through one or more ports (not shown) into annular manifold 58. The annular manifold 58 enables distribution of the heated air into an annular array of ports 60 through the base plate 32.

The annular array of ports 60 permits the heated air to flow into the aligned annular passage 62 through rotor 24. From passage 62, heated air flows between structural ribs 64 which bridge the portions of rotor 24 carrying optical tubes 40 and detectors 42. Optionally, one or more resistive heating elements 66 carried on thin sections of printed circuit board (not shown) can be mounted on base plate 32 either in alignment with, or between, ports 60. Elements 66 can be suitably distributed to produce spacial temperature uniformity for correction required by any localized source of heat. The annular passage 62 is aligned below the annular trough 68 forming an air bath through which the cuvettes revolve between optical tubes 40 and photoelectric detectors 42.

One or more temperature sensing devices 70, for example, a thermistor, is preferably positioned by mounting on rib 64 of rotor 24; thus mounted on the rotor 24, thermistor 70 can revolve within trough 68 in order to monitor the temperature of the air that is flowing in contact with the cuvettes 12.

Referring to FIG. 1, air flowing from trough 68 is partitioned into two paths indicated by arrows; one leads from trough 68 radially inward toward axis 20 into an annular channel 72 generally surrounding optical tubes 40. From channel 72 the air passes through a plurality of annularly arranged ports 74 passing upwardly through rotor 24 for exit surrounding lamp cover 78. A second exit path leads from trough 68 radially outward from axis 20 into a narrow channel 80 shown between turntable 14 and photodetectors 42, with discharge to the atmosphere.

Even when heater 44 has been well designed and is properly sized, there will be an inherent overshoot and undershoot of the desired temperature at the air bath trough 68 and cuvettes 12 because the on-off operation of the heater will create time delay in heat transmission between the heater and the cuvettes. The production of such overshoot and undershoot is typical of other dual-mode servomechanisms and device, such as motors and other drivers, to which the improved control system of this invention can be applied.

Figure 2A:
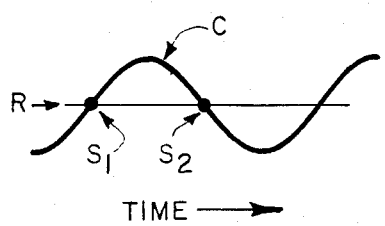
FIGS. 2a, 2b and 2c are waveforms for a signal generally representing a controlled variable which is the output of a servomechanism operated under dual-mode switching which produces overshoot and undershoot of the variable with respect to a reference value, and the three waveforms respectively illustrate three different conditions of overshoot relative to undershoot over time.
Figure 2B:
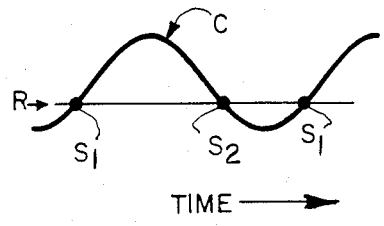
Figure 2C:
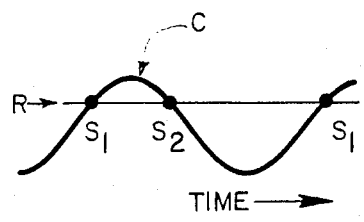

Illustration of general overshoot and undershoot, even under accurate on-off switching, is presented in FIG. 2 in which the output which the system is controlling is the variable C and a reference input R establishes the desired output value for comparison by feedback. The intersection of C and R are the switching points of the servomechanism. Thus, in the heater system for the analyzer instrument illustrated in FIG. 1, at $S_1$, C (the temperature of the air bath trough 68 and cuvettes 12 as monitored by the thermistor 70) is exceeding R (for example 37° C.) and the heater 44 will turn off. At $S_2$, C is falling below R, and the heater 44 will turn on. While FIG. 2a illustrates the condition in which the duration and intensity of overshoot are approximately equal to the duration and intensity of undershoot, FIGS. 2b and FIG. 2c illustrate conditions in which the system produces overshoot which either exceeds or is less that the undershoot, respectively, so that the mean value of C over time exceeds or is less than reference R which is the switching point. In many systems small instantaneous errors in overshoot and undershoot can be tolerated, but the average of such errors over time is more critical, as expressed in an error criteria such as the mean error over time or the root-mean-square (RMS) error over time. For example, if the specification for the heating system illustrated in FIG. 1 is an overshoot or undershoot less than 0.1° C., a more critical specification for the mean error over one minute could be less than 0.01° C. As a result, in order to control the time-averaged overshoot and undershoot within required limit, a control system in accordance with this invention will produce adjustment in the switching point for the dual-mode operation of a device or servomechanism, for example the heater for the analyzer of FIG. 1.

In mathematical terms, if P is the value of the controlled variable C (temperature) at which switching of the servo-mechanism (heater) occurs, then delta P (the required shift in the set point between the reference value R and C) can be calculated in real time by an error processor in accordance with this invention. For example in using the definition of mean error, mean overshoot or undershoot error can be corrected directly by a corresponding shift, delta P, in the switching point, and it can be shown that the required delta P equals — [mean error C].

Figure 3:
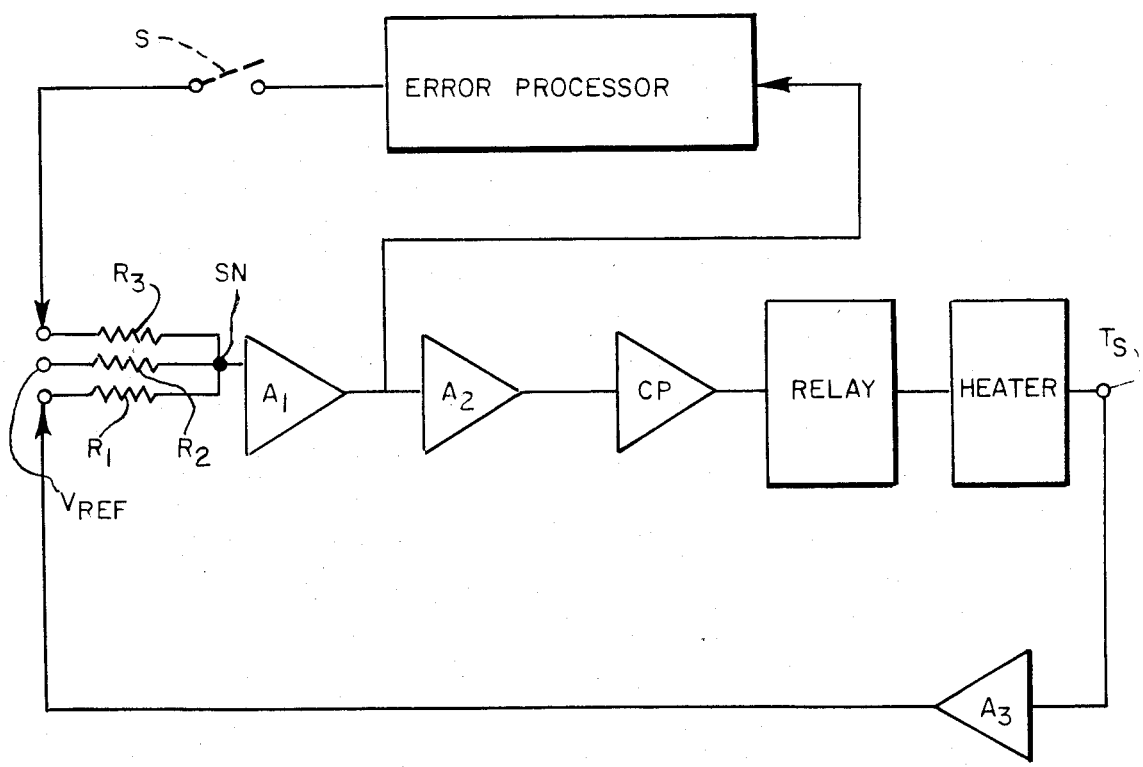
FIG. 3 illustrates a block diagram of one embodiment of the control system of this invention.

FIG. 3 illustrates a block diagram of one embodiment of a control system according to this invention, for particular application to the heating system of analyzer instrument such as that illustrated in FIG. 1. Referring to FIG. 3, the control system produces on-off operation of the HEATER (corresponding to heater 44 in FIG. 1) by controlling the switching point of the HEATER using a secondary loop including an ERROR PROCESSOR. The temperature of the heated air from the HEATER is monitored by a thermistor $T_s$ (corresponding to thermistor 70 in FIG. 1) which generates a signal amplified by thermistor amplifier $A_3$. The output signal from amplifier $A_3$ is the feedback signal from the thermistor $T_s$ through resistor $R_1$ to a summing node SN. Thermistor amplifier $A_3$ can be carried by one of the circuit boards 46, illustrated in FIG. 1, so that the output from amplifier $A_3$ is transmitted over slip ring 47 in FIG. 1 to the summing node SN which is located in a separate processing module with the remaining components of the control system.

At summing node SN reference voltage $V_{REF}$ is applied from resistor $R_2$ and is set to balance the amplified thermistor signal from $A_3$ at the target temperature (for the cuvette trough 68 in FIG. 1). In addition the output signal from the ERROR PROCESSOR is also applied to the summing node SN through resistor $R_3$ (with conceptual switch S closed). The output of the ERROR PROCESSOR is effectively a modification of the reference signal $V_{REF}$ at the summing node SN. Thus, the signal from SN is an error signal which represents the difference of error between the amplified thermistor signal from $A_3$ and the reference signal $V_{REF}$ as effectively modified by the signal from the ERROR PROCESSOR.

The error signal at the summing node SN is amplified at $A_1$ and the amplified error signal from $A_1$ is separately input both to amplifier $A_2$ and to the ERROR PROCESSOR. The output of high gain amplifier $A_2$ is sent to comparator CP. Comparator CP will activate the dual-mode switching action so that when the output of amplifier $A_2$ is greater than 0, the signal from comparator CP through the RELAY will turn on the HEATER, and when the output of amplifier $A_2$ is less than 0, the signal from comparator CP will turn off the HEATER.

The amplified error signal from amplifier $A_1$ is applied as input to the ERROR PROCESSOR which generates a resultant signal representative of the variation of the error over time between the amplified thermistor signal and the reference voltage $V_{REF}$; the resultant signal is applied through resistor $R_3$ to the summing node SN in order to modify the effect of $V_{REF}$ and thereby shift the point at which the output of amplifier $A_2$ is 0 and switching of the heater occurs in relation to the thermistor signal. Thus, the processing of the error will automatically modify the switching point to shift the range of the overshoot and undershoot into the desired range as reflected in the signal from the thermistor.

Figure 4:
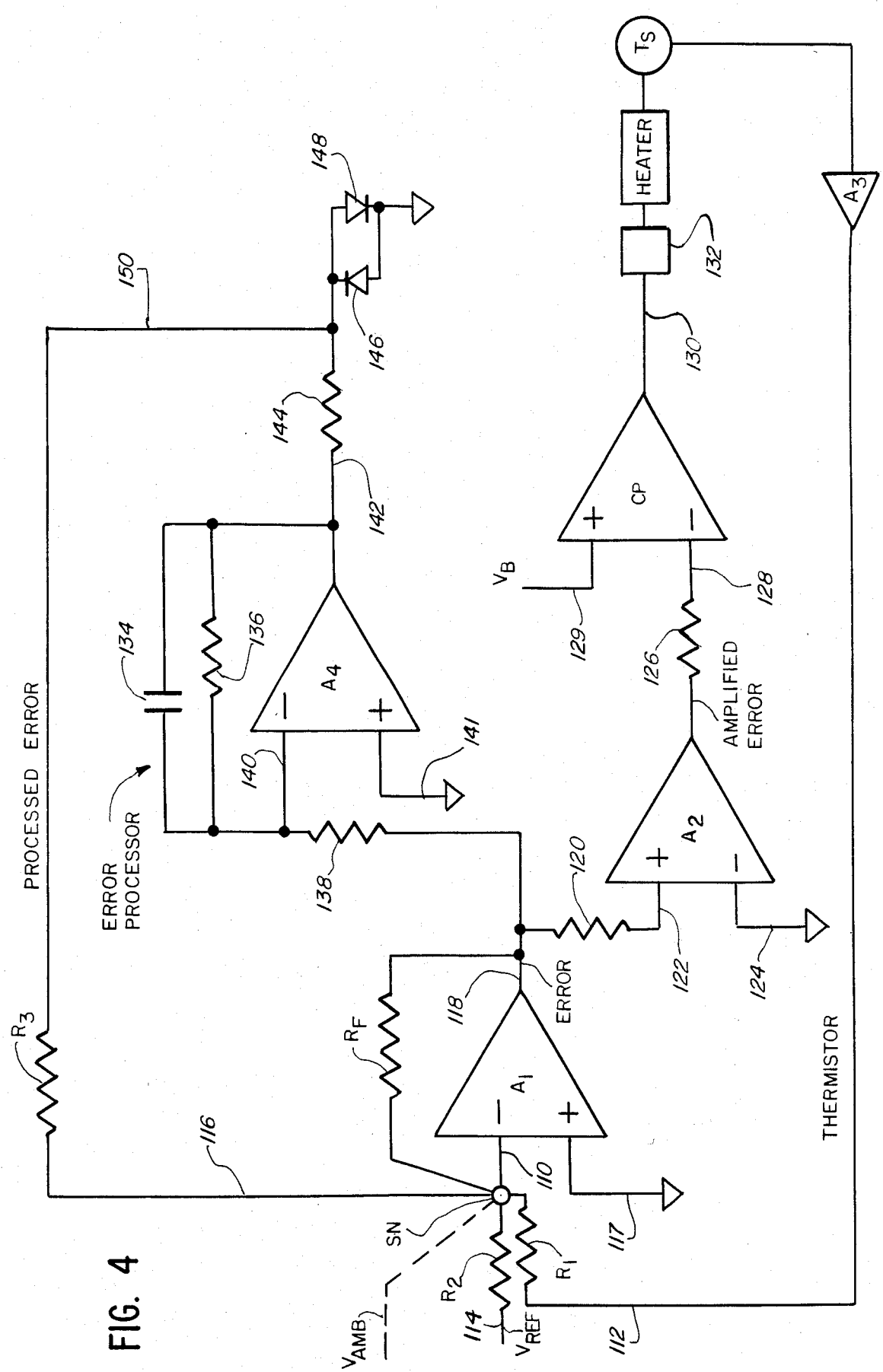
FIG. 4 is a circuit diagram illustrating specific structure for the diagram of FIG. 3.

FIG. 4 illustrates components of a circuit structure for the diagram of FIG. 3. In FIG. 4, a SUMMING signal is presented at summing node SN. The SUMMING signal is the negative input to summing amplifier $A_1$ on lead 110. The SUMMING signal is the sum of THERMISTOR signal on lead 112 through resistor $R_1$; a reference voltage signal $V_{REF}$ on lead 114 through resistor $R_2$; and a PROCESSED ERROR signal on lead 116 from resistor $R_3$. Optionally, an additional ambient sensor signal $V_{AMB}$ can be applied at summing node SN to provide a small compensation for large changes in the temperature of the ambient air near the intake of the blower 45 in FIG. 1.

The THERMISTOR signal on lead 112 is an analog voltage level representation of the temperature sensed by temperature sensor $T_s$, after amplification by amplifier $A_3$. For example, at 37° C. the THERMISTOR signal can be set by amplification at about 5 volts. As the temperature increases so does the voltage level of the THERMISTOR signal and, conversely, as the temperature decreases.

$V_{REF}$ is a reference signal which is set by circuit means (not shown) to balance the feedback THERMISTOR signal at the target temperature; the PROCESSED ERROR signal on lead 116 is effectively a modification of the reference signal $V_{REF}$ at summing node SN.

The SUMMING signal on lead 110 is the negative input to summing amplifier $A_1$ whose positive input is connected to circuit ground on lead 117. Amplifier $A_1$ is provided with a feedback resistor $R_F$ connected between output lead 118 and summing node SN. When amplifier $A_1$ has a gain of $-1$, the output signal which is referred to as ERROR, on lead 118 will be merely reversed in polarity from the SUMMING signal input to $A_1$. The ERROR signal is fed as input to both the ERROR PROCESSOR circuit, described hereinafter, and is also fed as input to high gain amplifier $A_2$ in the forward loop for subsequent heater control.

The ERROR signal is fed through resistor 120 to the positive input of the non-inverting amplifier $A_2$ whose negative input is grounded on lead 124. The output from amplifier $A_2$, referred as to AMPLIFIED ERROR signal, is fed through resistor 126 to the negative input of comparator CP on lead 128. A biasing voltage $V_B$ is applied on lead 129 to the positive input of comparator CP so that the reference voltage of the comparator can be set at approximately zero potential. Comparator CP functions to control on-off switching of the HEATER so that the comparator output signal is fed on line 130 to the power relay 132 which turns on the HEATER whenever the AMPLIFIED ERROR signal on lead 128 changes from negative to positive. When the AMPLIFIED ERROR signal to the comparator CP changes from positive to negative, the output signal on lead 130 and the power RELAY 132 will turn the HEATER off. The ERROR signal is also input to the ERROR PROCESSOR which includes an integrating circuit formed by capacitor 134, resistor 136, resistor 138 and high input impedance amplifier $A_4$. The gain from the ERROR PROCESSOR can be set by resistor 138 so that the gain will be less than 1, in order to prevent instability or oscillation in the entire circuit. For example, resistor 138 can be set in order to produce a gain in the integrating circuit in the range 0.9–0.95. Thus, through resistor 138 the ERROR signal is fed on lead 140 to the negative input of amplifier $A_4$ which is positively grounded at 141. The output of amplifier $A_4$ on lead 142 is fed through resistor 144 to optional clamping diodes 146 and 148 which limit the PROCESSED ERROR signal on line 150 within limits to limit the range of action of the circuit. The PROCESSED ERROR signal is a continuous signal proportional to the mean of the ERROR signal over the time period set by capacitor 134 and resistor 136, for example, approximately 1 minute. The PROCESSED ERROR signal appears through resistor $R_3$ on lead 116 and produces effective modification of the reference signal $V_{REF}$ appearing on the lead 114 to the summing node SN.

In the control circuit of FIG. 4, the output of the ERROR PROCESSOR is positive feedback to the input of amplifier $A_1$ because there is one phase reversal in $A_1$ and a second phase reversal in the ERROR PROCESSOR. For circuit stability the gain of the ERROR PROCESSOR must be less than 1 and a practical value of 0.95 has been found effective in eliminating 95% of the mean error.

The components of the circuit illustrated in FIG. 4 can be provided as follows, and variations can be made to achieve suitable modifications.

| Resistor $R_1$ | 16.5 Kilohm 1% |
|---|---|
| Resistor $R_2$ | 16.5 Kilohm 1% |
| Resistor $R_3$ | 16.9 Kilohm 1% |
| Resistor $R_F$ | 16.5 Kilohm 1% |
| Resistor 120 | 1.62 Kilohm 1% |
| Resistor 126 | 220 ohms 5% |
| Resistor 138 | 10 Megohm 1% |
| Resistor 144 | 2 Kilohm 1% |
| Capacitor 134 | 5 microfarad |
| Amplifier $A_1$ | LM 201 |
| Amplifier $A_2$ | LM 201 |
| Amplifier $A_3$ | LM 201 |
| Amplifier $A_4$ | AD 542K, Analog Devices Inc. |
| Diode 146 | IN 4148 |
| Diode 148 | IN 4148 |
| Comparator CP | LM 311, voltage comparator |
| Relay 132 | D2410, Crydom Controls INC. |
| Heater | 600 watts |

Figure 5:
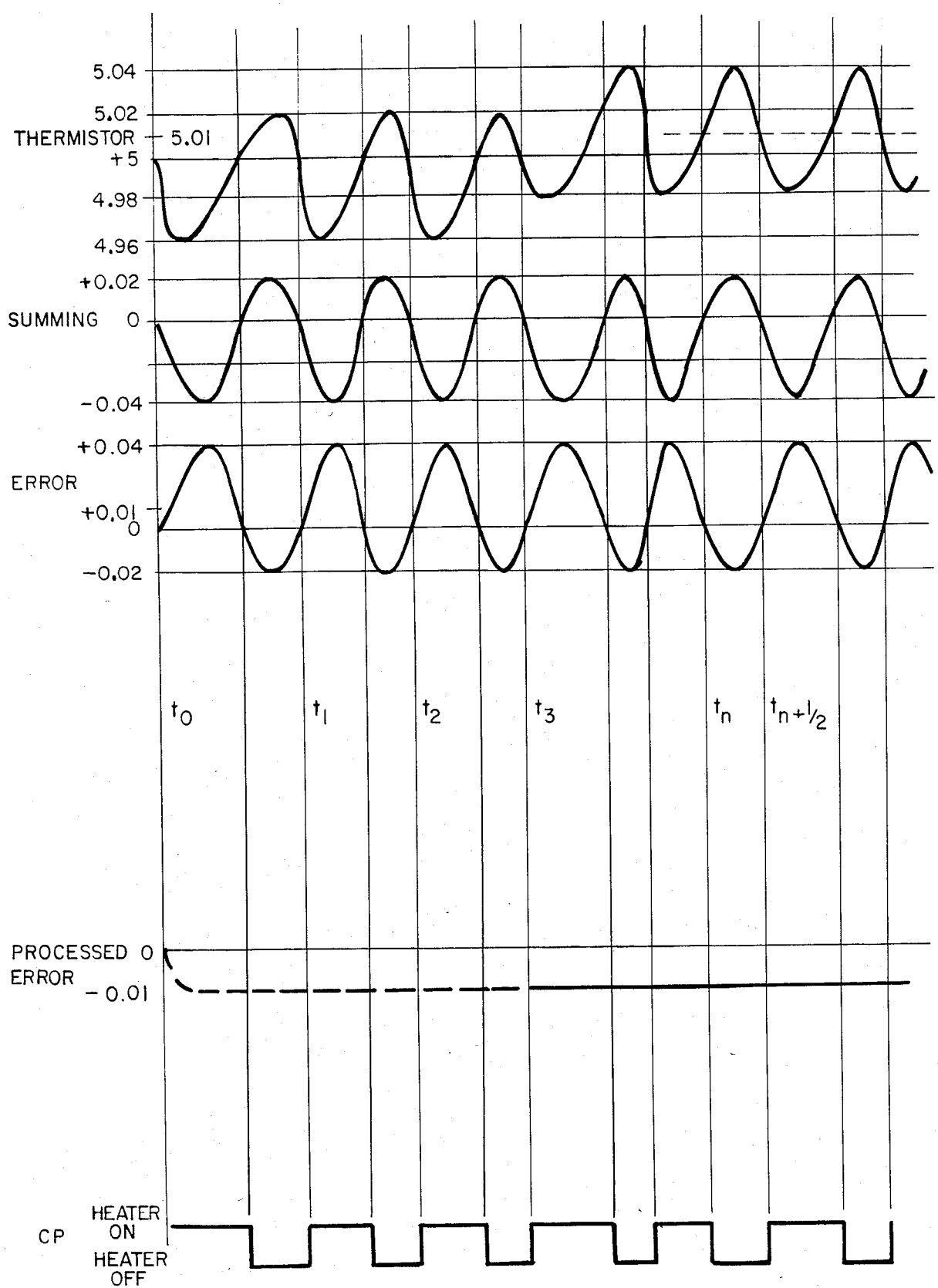
FIG. 5 is a chart illustrating the timing of the operation of the circuit of FIG. 4.

FIG. 5 illustrates idealized, exemplary waveforms for signals produced in the operation of the circuits of FIGS. 3 and 4. If at $t_0$ the conceptual switch S in FIG. 3 from the ERROR PROCESSOR is open, and if the controlled temperature and THERMISTOR signal are on an average consistently lower than the desired temperature of for example, 37° and 5 volts respectively, the switching point of the hater could be optimized to occur at some finite higher temperature than 37°. Thus, the THERMISTOR signal waveform may have a representative peak-to-peak range of 4.96 volts to 5.02 volts. If the reference voltage $V_{REF}$ at the summing node SN is set at −5 volts to produce switching at a balancing THERMISTOR signal of 5 volts, the corresponding ERROR signal from inverting amplifier $A_1$ (which reverses the polarity of the summing signal from summing node SN) will be a waveform having a peak-to-peak amplitude range of +0.04 to −0.02 and the mean of the ERROR signal may be, for example, approximately +0.01.

If the conceptual switch S is now closed at t3, the output of the ERROR PROCESSOR, which is set at a gain of −0.95, will be a negative voltage at −0.0095 volts, that is, −95% of the mean of the ERROR signal. As a result, the switching point on the comparator CP waveform at which the heater is turned on and off when the ERROR signal crosses the zero base line, for example at $t_n$ and $t_n + \frac{1}{2}$, will now occur when the THERMISTOR signal is 5.0095 (approximately 5.01 on the THERMISTOR signal waveform). Thus, the peak-to-peak amplitude range of the THERMISTOR signal will be shifted upward to approximately 4.98 to 5.02 indicating increase in the mean controlled temperature due to the adjustment of the switching point induced by the PROCESSED ERROR signal, and 95% of the desirable shift is achieved which would be beyond the control of the THERMISTOR signal feedback loop alone.

If a transient factor or some new thermal condition of the environment produces modification of the THERMISTOR signal, the ERROR PROCESSOR signal will react in opposition to the disturbance to modify the switching point with respect to the temperature and THERMISTOR signal.

Figure 6:
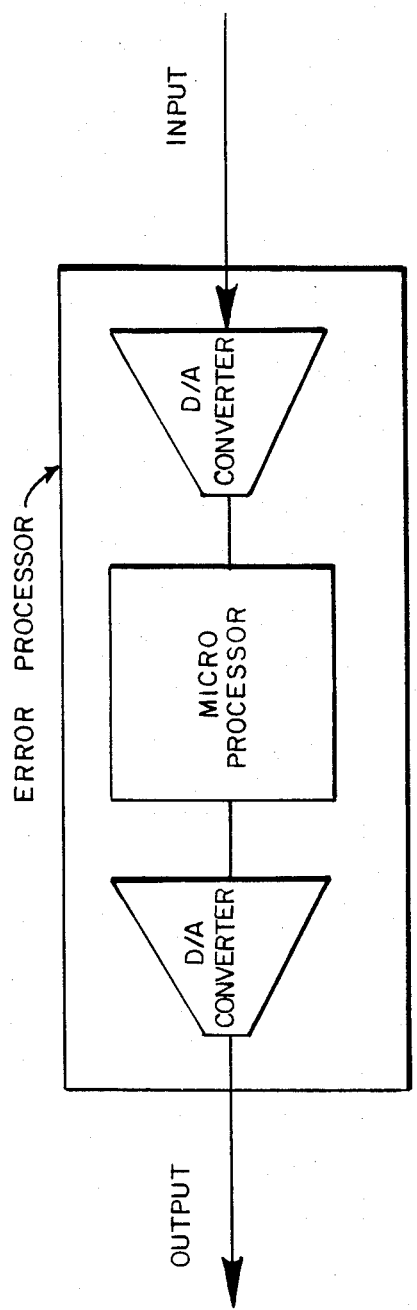
FIG. 6 is a diagram illustrating an alternative error processing unit in accordance with the invention.

FIG. 6 illustrates an alternative embodiment of the ERROR PROCESSOR shown in the diagram of FIG. 3. In FIG. 6, the input error signal is converted from analog-to-digital form in an A/D Converter, for processing in a typical digital Microprocessor or an equivalent processing unit. The Microprocessor can be suitably constructed for calculation of any desired statistical processing of the error signal to generate a resultant signal representative of the variation of the error signal over time. For example, the Microprocessor can generate the root-mean-square (RMS) error so that if the RMS value of the error signal exceeds the RMS value of the reference ($V_{REF}$) the switching point of the controlled device is lowered, and conversely. The output resultant signal from the Microprocessor is a digital signal which is converted from digital form to analog form in the D/A Converter to provide compatability with analog circuitry, for example, as illustrated in FIG. 3.

Modifications and variations in the control system of this invention can be made in light of the above teachings. It is therefore to be understood that within the scope of the appended claims, the invention can be practiced otherwise than as specifically described.

What is desired to secure by Letters Patent of the United States is:

1. An automatic control system for varying the switching point of a device relative to a variable output signal, which device operates in at least two modes of operation respectively on opposite sides of said switching point, said system comprising:
   A. means for generating said variable output signal in response to the operation of said device;
   B. combination means for producing an error signal comprising the combination of a constant reference signal, a processed error signal that varies, and said variable output signal, said error signal varying in response to both said processed error signal and said variable output signal relative to said constant reference signal;
   C. control means for switching the mode of operation of said device in response to said error signal; and
   D. error processing means for generating said processed error signal as a time-averaged function of said error signal.

2. The control system as claimed in claim 1, wherein said first mode constitutes activation of said device and said second mode constitutes inactivation of said device.

3. The control system as claimed in claim 1, wherein said error processing means comprises an integrating circuit for generating said processed error signal comprising the mean value of said error signal.

4. The control system as claimed in claim 1, wherein said error processing means comprises an analog-to-digital converter for converting said error signal from analog to digital form, digital processing means for generating said resultant signal in digital form, and a digital-to-analog converter for converting said digital form of said processed error signal to analog form thereof for combination with said reference signal.

5. The control system as claimed in claims 1 or 4, wherein said processed error signal comprises the RMS value of said error signal.

6. The control system as claimed in claim 1, wherein said error processing means generates said processed error signal continuously.

7. The control system as claimed in claim 1, wherein said means for producing said error signal comprises means for summing said reference signal and said processed error signal.

8. An automatic control system for varying the switching point of an on-off operated heater relative to the temperature of a remote object heated by said heater, said system comprising:
   A. temperature sensing means for generating a signal representing the temperature of said object;
   B. combination means for producing an error signal comprising the combination of a constant reference signal, a processed error signal that varies, and said temperature signal, said error signal varying in response to both said processed error signal and said temperature signal relative to said constant reference signal;
   C. heater control means for switching the operation of said heater on or off in response to said error signal;
   D. error processing means for generating said processed error signal as a time-averaged function of the error signal.

9. The control system as claimed in claim 8, wherein said error processing means comprises an integrating circuit for generating said processed error signal comprising the mean value of said error signal.

10. The control system as claimed in claim 8, wherein said error processing means comprises an analog-to-digital converter for converting said error signal from analog to digital form, digital processing means for generating said processed error signal in digital form, and a digital-to-analog converter for converting said digital form of said processed error signal to analog form thereof for combination with said reference signal.

11. The control system as claimed in claim 8 or 10, wherein said resultant signal comprises the RMS value of said error signal over said time period.

12. The control system as claimed in claim 8, wherein said error processing means generates said processed error signal continuously.

13. The control system as claimed in claim 8, wherein said means for producing said error signal comprises means for summing said reference signal and said processed error signal.

14. A method for automatically varying the switching point of a device for controlling a variable, which device operates in at least two modes of operation respectively on opposite sides of said switching point, said method comprising:
   A. generating a variable output signal representing said variable;
   B. generating an error signal comprising the combination of a constant reference signal and said variable output signal;
   C. generating a processed error signal as a time-averaged function of said error signal;
   D. generating a modified error signal comprising combination of said processed error signal within said error signal; and
   E. switching the operation of said device between a first mode of operation and a second mode of operation in response to said modified error signal.

15. The method as claimed in claim 14, wherein generating said error signal comprises summing said reference signal and said output signal.

16. The method as claimed in claim 15, wherein said summing further comprises said processed error signal.

17. The method as claimed in claim 16, including negatively amplifying said modified error signal, and generating said processed error signal in opposite phase with respect to said modified error signal so that said processed error signal provides positive feedback with respect to said amplifying.

18. The control system as claimed in claim 1, wherein said combination means comprises means for summing said reference signal, said processed error signal, and said output signal.

19. The control system as claimed in claim 8, wherein said combination means comprises means for summing said reference signal, said processed error signal, and said object temperature singal.

* * * * *

UNITED STATES PATENT AND TRADEMARK OFFICE
CERTIFICATE OF CORRECTION

PATENT NO. : 4,495,405
DATED : January 22, 1985
INVENTOR(S) : John E. Foster

It is certified that error appears in the above-identified patent and that said Letters Patent are hereby corrected as shown below:

Column 8, line 67, Change "resultant" to --processed error--.

Column 10, line 2, Change "resultant" to --processed error--.

Column 10, line 3, Delete "over said time period".

Signed and Sealed this

Sixth Day of August 1985

[SEAL]

Attest:

DONALD J. QUIGG

Attesting Officer     Acting Commissioner of Patents and Trademarks